2,785,147
Patented Mar. 12, 1957

United States Patent Office

2,785,147

PROCESS FOR MAKING OCTAMETHYLCYCLO-TETRASILOXANE GELS

Simon W. Kantor, Schenectady, N. Y., assignor to General Electric Company, a corporation of New York No Drawing. Application May 11, 1954,
Serial No. 429,135

8 Claims. (Cl. 260—46.5)

This invention relates to a process of preparing organopolysiloxane elastomers, particularly organopolysiloxane gels, which process comprises (1) effecting reaction between octamethylcyclotetrasiloxane and from 0.2 to 20 percent by weight of an acyl peroxide to convert a portion of the octamethylcyclotetrasiloxane to 1,2-bis-heptamethylcyclotetrasiloxanyl-ethane, (2) removing the decomposition products of the aforesaid acyl peroxide by contacting the reaction products of (1) with an adsorbent material, (3) removing said adsorbent material to yield a mixture consisting essentially of octamethylcyclotetrasiloxane and 1,2-bis-heptamethylcyclotetrasiloxanyl-ethane, and (4) polymerizing said mixture by contact with from 0.001 to 0.5 percent by weight of an organopolysiloxane polymerization catalyst. This invention is also concerned with a method of preparing organopolysiloxane gels which have a high heat life by decomposing the polymerization catalyst mentioned above after polymerization has taken place.

Heretofore, organopolysiloxane gels have been prepared by polymerizing octamethylcyclotetrasiloxane with a polymerization catalyst to form an organoploysiloxane gum. This gum has then been treated with a cross-linking agent, such as an acyl peroxide, to form a gel. The foregoing method is disadvantageous in that the cross-linked product contains acids and esters which are formed by the decomposition of the cross-linking agent. These acids and esters, which are almost impossible to remove from the resulting product because of the solid state of the product, tend to cause degradation of the product to a lower molecular weight when the products are used at elevated temperatures. In my joint copending application with Robert C. Osthoff, Serial No. 429,131, filed concurrently herewith and assigned to the same assignee as the present invention, a method of eliminating non-silicone cross-linking agents is described in which 1,2-bis-heptamethylcyclotetrasiloxanyl-ethane is added to octamethylcyclotetrasiloxane to form a solution which is polymerizable to a gel by the typical organopolysiloxane polymerization catalysts without the addition of cross-linking agents. Although satisfactory gels having outstanding heat stability may be prepared by the method of the aforesaid copending application, that method is disadvantageous in that the compound 1,2-bis-heptamethylcyclotetrasiloxanyl-ethane must be prepared and isolated and then added to octamethylcyclotetrasiloxane to form the polymerizable mixture.

I have now discovered that organopolysiloxane gels may be prepared from 1,2-bis-heptamethylcylotetrasiloxanyl-ethane and octamethylcyclotetrasiloxane without the necessity of first preparing and isolating the former compound. The former compound may be prepared by treating octamethylcyclotetrasiloxane with an acyl peroxide to give a solution of the former compound in octamethyl-cyclotetrasiloxane. This solution also contains the decomposition products of the acyl peroxide and these products act as polymerization inhibitors so that it is necessary to remove these decomposition products before polymerization is attempted. These decomposition products, which are acids and esters, may be removed by subjecting the octamethylcyclotetrasiloxane solution to the action of a typical surface active adsorbent agent. After purifying the organopolysiloxane solution, polymerization may be carried out in the usual manner using typical organopolysiloxane polymerization catalysts.

The step of reacting the acyl peroxide with octamethylcyclotetrasiloxane may be conducted using a wide variety of concentrations of the peroxide and reaction temperatures. The net effect of the reaction is to join two heptamethylcyclotetrasiloxanyl radicals by a silicon-bonded ethylene bridge to form the 1,2-bis-heptamethylcyclotetrasiloxanyl-ethane in the octamethylcyclotetrasiloxane solution. During the course of the reaction the acyl peroxide is decomposed into a number of products. For example, when the acyl peroxide used is benzoyl peroxide the decomposition yields benzene, benzoic acid, p-phenylbenzoic acid diphenyl, and phenyl benzoate.

The amount of the acyl peroxide used in the process of the present invention may be varied within wide limits and depends to a large extent upon the properties desired in the final gel. The properties of the final gel depend on the concentration of 1,2-bis-heptamethylcyclotetrasiloxanyl-ethane (hereinafter referred to as "bis-compound") in the peroxide treated solution. For example, when the solution contains about 0.2 percent of the bis-compound the final product is a very flexible gel. As the concentration of the bis-compound increases the flexibility of the final gel is decreased until a relatively stiff gel is formed when using a bis-compound concentration of about 10 percent by weight. I have found that on a qualitative basis each weight percent of the acyl peroxide produces about one-half percent by weight of the bis-compound. Therefore, where a given percentage of the bis-compound is desired, twice that percentage by weight of the acyl peroxide is used. In general, I employ from about 0.2 to 20 percent acyl peroxide and preferably from 0.5 to 2.5 percent of the acyl peroxide to yield an octamethylcylclotetrasiloxane solution containing from 0.1 to 10 percent and preferably from 0.25 to 1.25 percent of the bis-compound. I have found that the reaction of the present invention will proceed using most organic peroxides. However, when using peroxides other than the acyl peroxides the rate of reaction is slower than desired for commercial applications. Therefore, the peroxides which are preferably used in the practice of the present invention are the acyl peroxides. Among the acyl peroxides which are suitable are included, for example, benzoyl peroxide, caprylyl peroxide, 2,4-dichlorobenzoyl peroxide, t-butylperbenzoate, etc.

The temperature employed in the reaction between the acyl peroxide and the octamethylcyclotetrasiloxane may vary within wide limits. In selecting the reaction temperature, two different reaction rates should be considered. The first rate to be considered is the rate of decomposition of the acyl peroxide. This rate is important since the reaction proceeds only after the decomposition of a portion of the peroxide. The second rate to be considered is the rate of reaction between the decomposition products of the acyl peroxide and the octamethylcyclotetrasiloxane. In practice, I have found that suitable temperatures for the reaction are from about 75 to 150° C. At these temperatures, the acyl peroxide decomposes rapidly enough to supply the necessary decomposition products to sustain the reaction with the octamethylcyclotetrasiloxane. At temperatures below about 75° C. the decomposition becomes so slow that the primary reaction is retarded. My preferred reaction temperature is about 120° C., at which temperature substantially complete reaction is obtained in a matter of a few minutes. The acyl peroxide reaction may be effected by merely adding all of the acyl peroxide to the octamethylcyclotetrasiloxane at once or by adding small portions of the peroxide to the octamethylcyclotetrasiloxane over a period of from two to ten minutes. At the temperatures employed in the peroxide reaction of the present invention, the benzene, which is formed as a decomposition product of the benzoyl peroxide usually boils off completely from the reaction mixture. However, even when small amounts of benzene are left in the reaction mixture it is found that the benzene has no adverse effect on the subsequent purification and polymerization of the product.

As disclosed above, the reaction mixture from the acyl peroxide-octamethylcyclotetrasiloxane reaction contains 1,2-bis-heptamethylcyclotetrasiloxanyl-ethane, as well as the decomposition products of the acyl peroxide. Since these decomposition products tend to retard the polymerization of the organopolysiloxanes, it is necessary to remove them before attempting polymerization. We have found that these decomposition products may be removed without difficulty by subjecting the reaction mixture to the action of an adsorbent material. This adsorbent material may be any of the typical surface active agents which are commercially available. For example, the surface active agent may be activated alumina, silica, activated carbon, fuller's earth, etc. The product of the acyl peroxide reaction usually has a color which varies from a very light yellow to a dark yellow. After treatment with the adsorbent material the purified oil is a clear colorless product which contains no acids or esters and consists essentially of octamethylcyclotetrasiloxane and the bis-compound. It has been found that the adsorbent material adsorbs a negligible amount of the two organopolysiloxane compounds. This purification of the acyl peroxide reaction product may be accomplished in any convenient manner. For example, the reaction products may be shaken with an adsorbent material until the acids and esters are adsorbed as indicated by the clearing up of the reaction mixture. The reaction product may also be passed through a column containing the adsorbent material until the mixture is cleaned up. The temperature at which this adsorption takes place may vary within wide limits, for example, from below room temperature to up to about 75° C. Preferably, I employ temperatures about room temperature since the amount of material adsorbed decreases at elevated temperatures. The amount of adsorbent material may also vary within wide limits, it being necessary only to have enough of the material available to clean up the reaction mixture. The amount of adsorbent material depends, of course, on the specific surface available per unit volume of the material and also on the activity of the material. The time of treatment with the adsorbent material is immaterial, it being necessary only to sustain contact between the material and the acyl peroxide reaction product until the reaction product is purified. The purified product consists essentially of octamethylcyclotetrasiloxane containing a small amount of the bis-compound.

The organopolysiloxane solution which has been purified with the adsorbent material may then be polymerized in the usual manner with organopolysiloxane polymerization catalysts. The purified oil sometimes contains dissolved air and where this is the case, it is often desirable to subject this solution to vacuum to remove any such air. This removal of the air insures that no air bubbles will be found in the finished gel. Among the many organopolysiloxane polymerization catalysts which may be used are included the typical organopolysiloxane rearrangement and condensation catalysts such as, sodium hydroxide, potassium hydroxide, cesium hydroxide, and other metal hydroxides as well as the transient type polymerization catalysts such as the solid quaternary ammonium hydroxides which are disclosed in my copending application Serial No. 429,132, and the quaternary phosphonium compounds disclosed in my joint copending application with Alfred R. Gilbert, Serial No. 429,134, both the latter applications being filed concurrently herewith and assigned to the same assignee as the present invention. The ratio of the polymerization catalyst to organopolysiloxane solution depends on the particular catalyst being used. For example, when metal hydroxide catalysts are employed, the ratio of metal hydroxide to organopolysiloxane solution may vary from about 0.1 percent to 0.5 percent by weight. When using a solid quaternary ammonium hydroxide catalyst such as, for example, tetramethyl ammonium hydroxide or trimethyl benzyl ammonium hydroxide, the concentration of catalysts may vary from about 0.004 to 0.2 percent by weight. When using quaternary phosphonium compounds such as, for example, tetramethyl phosphonium hydroxide, tetraethyl phosphonium hydroxide, tetra-n-butyl phosphonium hydroxide, dimethyldiethyl phosphonium hydroxide, phenyl trimethyl phosphonium hydroxide, butyl tricyclohexyl phosphonium hydroxide, or tetrabutyl phosphonium butoxide, the concentration of catalysts may vary from about 0.001 to 0.5 percent, by weight. The term "catalytic amount of an organopolysiloxane polymerization catalyst" as used in the appended claims is intended to refer to any amount of an organopolysiloxane polymerization catalyst of the type described above which will polymerize a low molecular liquid organopolysiloxane to an elastomer. Preferably, the catalytic amounts are within the ranges just described.

The temperature at which the polymerization is carried out may vary within wide limits depending on the particular polymerization catalyst used. For example, when using potassium hydroxide as a catalyst, a temperature from 145 to 160° C. is employed. The temperature employed with cesium hydroxide is from 110 to 150° C., the temperature employed with quaternary phosphonium catalysts is from room temperature to 130° C., and the temperature employed with quaternary ammonium catalysts is from about 75 to 130° C. The time for polymerization also varies with the particular catalyst used. Thus, two to three hours are required when using potassium hydroxide as a catalyst, while polymerization is effected in a matter of minutes when using a quaternary ammonium or phosphonium catalyst.

The product of the polymerization of the present process is a methyl polysiloxane gel which varies from a very flexible product to a relatively rigid product depending on the concentration of the 1,2-bis-heptamethyl-cyclotetrasiloxanyl-ethane in the reaction mixture. The gel is believed to be formed by rupturing the rings of the cyclic methyl polysiloxanes and joining the linear chains formed to produce a long chain structure. This structure is cross-linked by the ethylene bridges which are present in the 1,2-bis-heptamethylcyclotetrasiloxanyl-ethane. Since the product is a gel, it is desirable to cause the polymerization to occur without stirring of the reaction mixture to avoid the formation of air bubbles in the resulting gel. The polymerization is preferably effected by adding the polymerization catalyst to the octamethylcyclotetrasiloxane solution at room temperature and heating the resulting mixture to the temperature at which polymerization is to be carried out. The catalyst may be added to the solution in its solid form in the case of the metal hydroxides and the quaternary ammonium catalysts and may be added as a concentrated aqueous or concentrated organopolysiloxane solution in the case of the quaternary phosphonium compound catalysts. In the case of all of the catalysts the addition may be in the form of the silanolate if desired.

Where the resulting gel is to be used in high temperature applications, I prefer to employ a transient quaternary ammonium or quaternary phosphonium catalyst in preference to a metal hydroxide catalyst. When using these transient catalysts, it is possible to cause decomposition of the catalysts after polymerization has taken place to insure that the catalysts will have no adverse effect on the gel at high temperatures. When using the metal hydroxide catalysts, it is well known that the presence of the catalyst in the finished product tends to cause degradation of the resulting gel to a low molecular weight state on subsequent use of the catalyst at high temperatures. Thus, when using a metal hydroxide catalyst to form a gel, the product will revert to a low molecular weight and evaporate in a matter of hours when maintained at a temperature of about 250° C. Under the same conditions, a gel formed with one of the transient catalysts will remain stable indefinitely at temperatures of 250° C.

Where transient catalysts have been used to form the gel, it is desirable to heat the product for several minutes at a temperature above the decomposition temperature of the transient catalyst to cause decomposition and inactivation of the catalyst. In general, these transient catalysts decompose at temperatures slightly above 130° C. so that heating is preferably carried out at temperatures above 130° C. The time of heating is immaterial, it being necessary only to heat the entire gel above the decomposition temperature of the transient catalyst. Since heat transfer through organopolysiloxane gels is somewhat slow, it is desirable to maintain the entire gel at a temperature above the decomposition temperature for from 10 to 20 minutes to make sure that the interior portion of the gel reaches the decomposition temperature. Where the transient catalyst-produced gel is to be used at elevated temperatures, this decomposition step may be eliminated and decomposition will take place as soon as the gel is first heated to a temperature above about 130° C.

The gels formed by the method of the present invention are useful as potting gels in electrical apparatus because of their good electrical properties and low shrinkage. For example, the polymerization of the octamethylcyclotetrasiloxane-bis-compound solution may take place in a piece of electrical apparatus with practically no change in volume during the polymerization. The density of the octamethylcyclotetrasiloxane solution is about 0.956 at 20° C. while the density of the gel is about 0.97 at 20° C. Where the gels of the present invention are formed by transient-catalyzed polymerization, the gels may be used in electrical apparatus which are maintained at temperatures up to about 250° C. for indefinite periods of time.

The following examples are illustrative of the practice of my invention and are not intended for purposes of limitation:

*Example 1*

A solution of 1,2-bis-heptamethylcyclotetrasiloxanyl-ethane in octamethylcyclotetrasiloxane was prepared by placing 500 rams of the latter compound in a three-necked flask equipped with a glass stirrer. The flask and its contents were then heated to 120° C. and 5 grams (1 percent, by weight) of benzoyl peroxide was added to the stirred compound over a period of three minutes. The solution was stirred for one hour at 120° C. after the addition to insure complete reaction. After the reaction mixture was cooled the mixture was filtered and a clear, light yellow oil containing about 0.5 percent by weight of the bis-compound was obtained. Following this same procedure samples of octamethylcyclotetrasiloxane were treated with 1.5, 2.0, and 2.5 percents by weight of benzoyl peroxide to yield other solutions containing different amounts of the bis-compound. The table below lists the percentage concentration of the benzoyl peroxide, used, the time for addition of the benzoyl peroxide, the color of the resulting product, and the approximate bis-compound concentration in the product.

| Percent $B_2O_2$ By weight | Addition Time, Minutes | Color | Bis-Compound Concentration, Wt. percent |
| --- | --- | --- | --- |
| 1.0 | 3 | Light yellow | 0.5 |
| 1.5 | 5 | do | 0.75 |
| 2.0 | 9 | Medium yellow | 1.0 |
| 2.5 | 10 | Dark yellow | 1.25 |

*Example 2*

A solution of 1,2 bis-heptamethylcyclotetrasiloxanyl-ethane in octamethylcyclotetrasiloxane was prepared by adding 7.5 grams of t-butylperbenzoate to 500 grams of octamethylcyclotetrasiloxane which was maintained at 120° C. with stirring. The resulting product was a light yellow solution containing about 0.25 percent of the bis-compound together with the acid and ester decomposition products of the t-butylperbenzoate.

*Example 3*

This example shows the method of purifying the products prepared in Examples 1 and 2. Four columns of adsorbent material were prepared having a cross-section of about 2 centimeters diameter and a height of from 15 to 20 centimeters. One column was filled with one hundred mesh activated alumina, one with silica, one with fuller's earth, and one with activated charcoal. A separate 50 ml. sample of each of the acyl peroxide reaction products from Examples 1 and 2 were passed through each of the four columns. In every case the product passing out of the column was a clear, colorless oil consisting essentially of octamethylcyclotetrasiloxane containing small amounts of 1,2-bis-heptamethylcyclotetra-siloxanyl-ethane. A 50 ml. sample of the light yellow benzoyl peroxide reaction product of Example 1 which originally contained 1.5 percent by weight of benzoyl peroxide was shaken with about 10 grams of alumina for one hour. This sample, too, was purified to form a clear, colorless organopolysiloxane solution.

*Example 4*

A 50 ml. sample of each of the mixtures prepared in Examples 1 and 2 and purified in Example 3 was placed in reaction vessels and 0.01 gram of solid tetramethyl ammonium hydroxide was added to each sample. Each sample was then evacuated for fifteen minutes to remove any dissolved air. Each sample was then heated to about 110° C. and maintained at this temperature for about 15 minutes. At the end of this time each of the samples had polymerized to a clear, colorless gel. Each gel was then heated to about 150° C. and maintained at this temperature for about one hour to cause decomposition of the tetramethyl ammonium hydroxide. The resultant products were tough gels whose flexibility decreased as the amount of benzoyl peroxide in the initial mixture increased.

*Example 5*

An organopolysiloxane solution of tetra-n-butyl phosphonium hydroxide containing 21 mg. of the hydroxide per ml. of organopolysiloxane was prepared by adding a 13 percent aqueous solution of tetra-n-butyl phosphonium hydroxide to octamethylcyclotetrasiloxane which was maintained at a temperature of about 110° C. One ml. of this organopolysiloxane solution of tetra-n-butyl phosphonium hydroxide was added to 100 ml. of the product which was prepared by the method of Examples 1 and 3 by reacting 1.5 percent by weight of benzoyl peroxide with octamethylcyclotetrasiloxane and purifying the resulting solution with the one hundred mesh alumina column of Example 3. This catalyst-containing solution was evacuated for fifteen minutes to remove dissolved air and after the vacuum was released, the solution was placed in an oil bath at 110° C. After fifteen minutes, a clear, colorless gel was formed. This gel was then heated at 150° C. for an additional hour to decompose the catalyst. This gel showed a weight loss of from 12 to 15 percent after being maintained at 250° C. for sixteen hours. This weight loss represents volatilization of the low molecular weight cyclic organopolysiloxanes in equilibrium with the high molecular weight gel.

What I claim as new and desire to secure by Letters Patent of the United States is:

1. The process of preparing an organopolysiloxane elastomer which comprises (1) effecting reaction between octamethylcyclotetrasiloxane and from 0.2 to 20 percent by weight of an acyl peroxide to convert a portion of the octamethylcyclotetrasiloxane to 1,2-bis-heptamethylcyclotetrasiloxanyl-ethane, (2) removing the decomposition products of the aforesaid acyl peroxide by contacting the reaction products of (1) with an adsorbent material, (3) removing said adsorbent material to yeld a mixture consisting essentially of octamethylcyclotetrasiloxane and 1,2 - bis - heptamethylcyclotetrasiloxanyl - ethane, and (4) polymerizing said mixture by contact with a catalytic amount of an organopolysiloxane rearrangement and condensation catalyst.

2. The process of claim 1 in which the acyl peroxide is benzoyl peroxide.

3. The process of claim 1 in which the acyl peroxide is t-butylperbenzoate.

4. The process of preparing an organopolysiloxane elastomer which comprises (1) effecting reaction between octamethylcyclotetrasiloxane and from 0.2 to 20 percent by weight of an acyl peroxide to convert a portion of the octamethylcyclotetrasiloxane to 1,2-bis-heptamethylcyclotetrasiloxanyl-ethane, (2) removing the decomposition products of the aforesaid acyl peroxide by contacting the reaction produts of (1) with an adsorbent material, (3) removing said adsorbent material to yield a mixture consisting essentially of octamethylcyclotetrasiloxane and 1,2-bis-heptamethylcyclotetrasiloxanyl-ethane, and (4) polymerizing said mixture by contacting the latter with a catalytic amount of a transient organopolysiloxane rearrangement and condensation catalyst selected from the class consisting of solid tetramethyl ammonium hydroxide, solid benzyl trimethyl ammonium hydroxide and quaternary phosphonium hydroxides.

5. The process of claim 4 in which the acyl peroxide is benzoyl peroxide.

6. The process of preparing an organopolysiloxane elastomer which comprises (1) effecting reaction between octamethylcyclotetrasiloxane and from 0.2 to 20 percent by weight of acyl peroxide to convert a portion of the octamethylcyclotetrasiloxane to 1,2-bis-heptamethylcyclotetrasiloxanyl-ethane, (2) removing the decomposition products of the aforesaid acyl peroxide by contacting the reaction products of (1) with an adsorbent material, (3) removing said adsorbent material to yield a mixture consisting essentially of octamethylcyclotetrasiloxane and 1,2-bis-heptamethylcyclotetrasiloxanyl-ethane, (4) polymerizing said mixture by contact with a transient organopolysiloxane rearrangement and condensation catalyst selected from the class consisting of solid tetramethyl ammonium hydroxide, solid benzyl trimethyl ammonium hydroxide, and quaternary phosphonium hydroxides, and (5) heating the polymerized product to a temperature above the decomposition temperature of said catalyst.

7. The process of preparing an organopolysiloxane elastomer which comprises (1) effecting reaction between octamethylcyclotetrasiloxane and from 0.2 to 20 percent by weight of an acyl peroxide to convert a portion of the octamethylcyclotetrasiloxane to 1,2-bis-heptamethylcyclotetrasiloxanyl-ethane, (2) removing the decomposition products of the aforesaid acyl peroxide by contacting the reaction products of (1) with an adsorbent material, (3) removing said adsorbent material to yield a mixture consisting essentially of octamethylcyclotetrasiloxane and 1,2 - bis - heptamethylcyclotetrasiloxanyl - ethane, and (4) polymerizing said mixture by contact with from 0.004 to 0.2 percent by weight of solid tetramethyl ammonium hydroxide.

8. The process of preparing an organopolysiloxane elastomer which comprises (1) effecting reaction between octamethylcyclotetrasiloxane and from 0.2 to 20 percent by weight of an acyl peroxide to convert a portion of the octamethylcyclotetra siloxane to 1,2-bis-heptamethylcyclotetrasiloxanyl-ethane, (2) removing the decomposition products of the aforesaid acyl peroxide by contacting the reaction products of (1) with an adsorbent material, (3) removing said adsorbent material to yield a mixture consisting essentially of octamethylcyclotetrasiloxane and 1,2 - bis - heptamethylcyclotetrasiloxanyl - ethane, and (4) polymerizing said mixture by contact with from 0.001 to 0.5 percent by weight of tetra-n-butyl phosphonium hydroxide.

References Cited in the file of this patent
UNITED STATES PATENTS 2,460,795     Warrick                 Feb. 1, 1949